May 29, 1956 J. HAVLIK 2,747,627
SEMI-AUTOMATIC DOVETAILING MACHINE
Filed Jan. 5, 1955 2 Sheets-Sheet 1
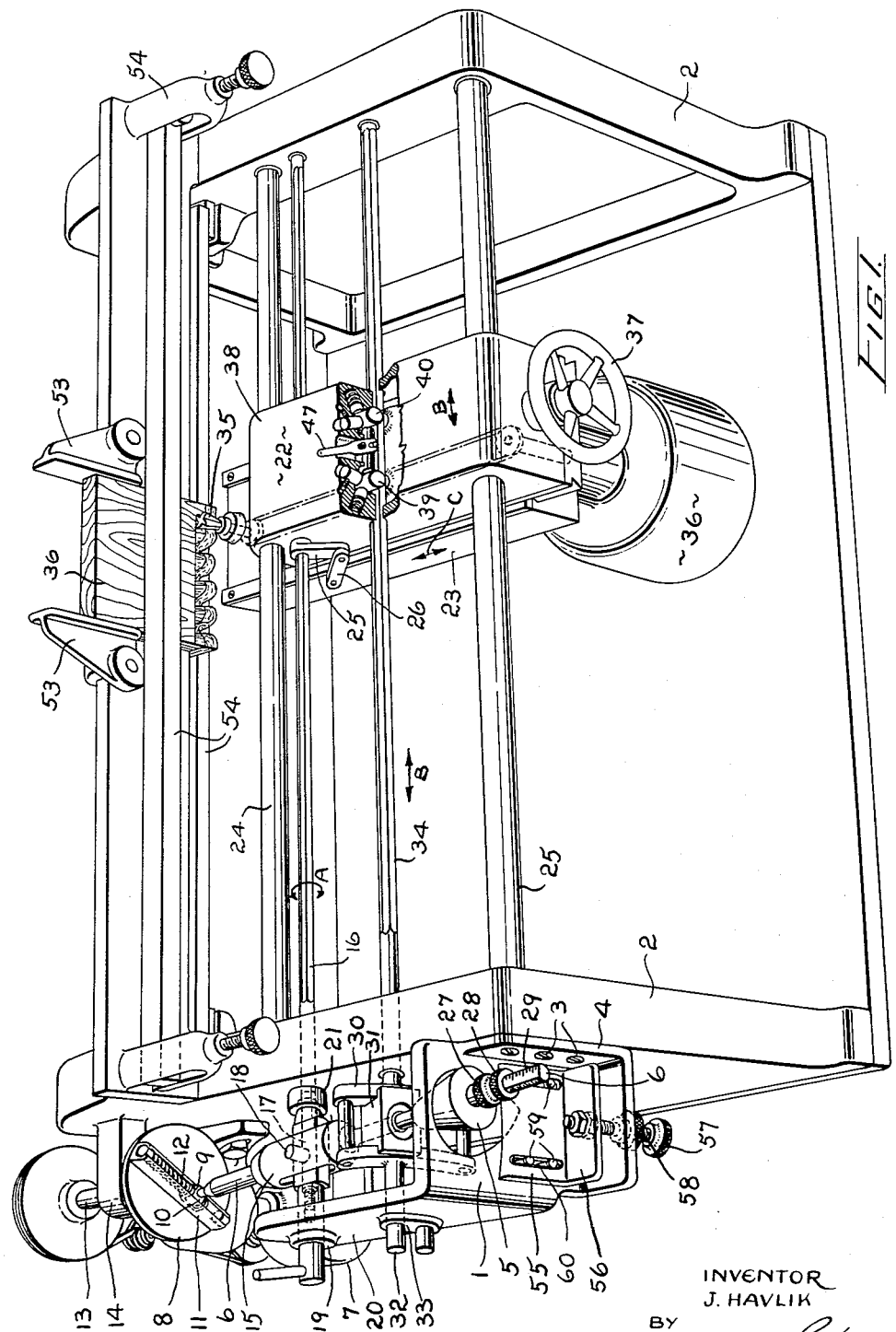
INVENTOR
J. HAVLIK
BY
C. Harold Richter
ATTORNEY May 29, 1956  J. HAVLIK  2,747,627
SEMI-AUTOMATIC DOVETAILING MACHINE
Filed Jan. 5, 1955  2 Sheets-Sheet 2
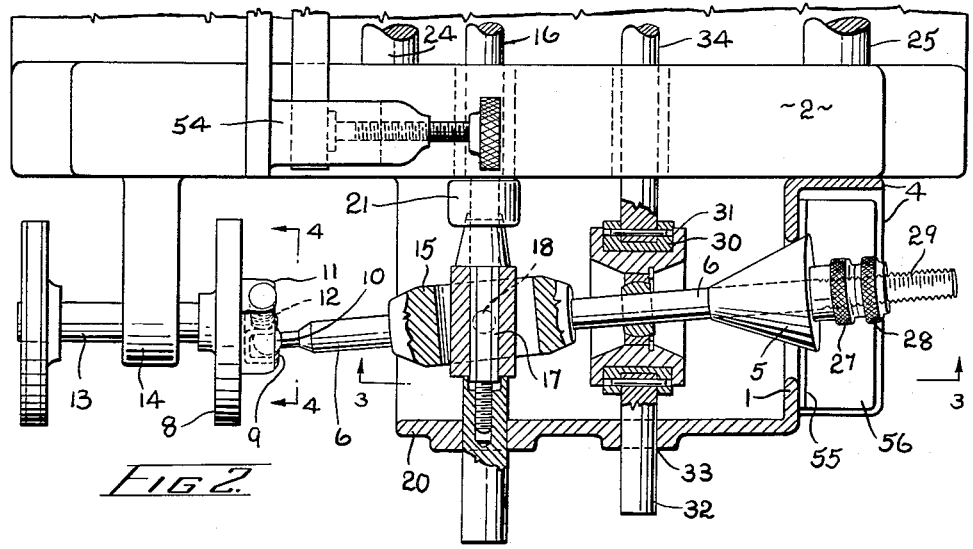
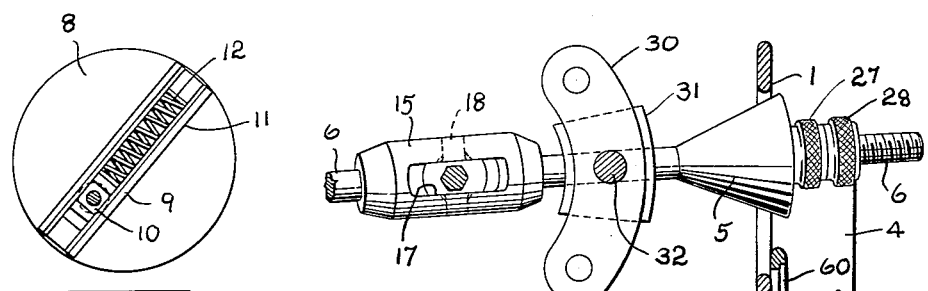
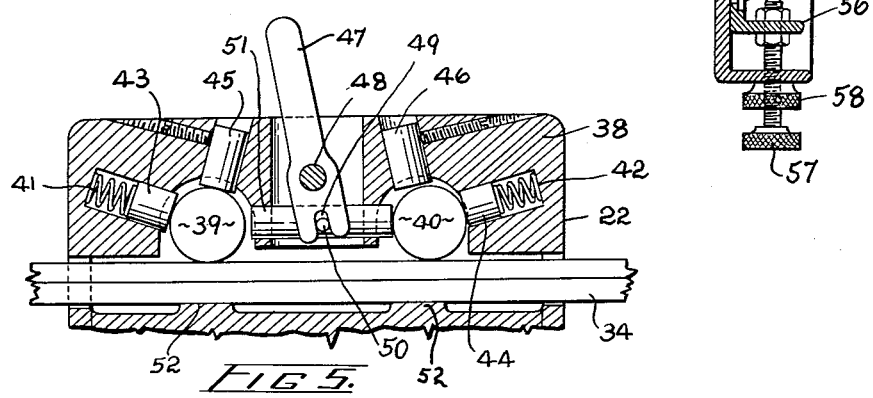
INVENTOR
J. HAVLIK
BY
ATTORNEY

United States Patent Office 2,747,627
Patented May 29, 1956

2,747,627

SEMI-AUTOMATIC DOVETAILING MACHINE

Jaroslav Havlik, Preston, Ontario, Canada

Application January 5, 1955, Serial No. 479,959

6 Claims. (Cl. 144—85)

The present invention relates to a dovetailing machine intended for producing dovetails on articles of wood, synthetic material or any other material, whereby the pieces may be interconnected to form a solid and attractive joint.

In producing dovetails on a machine, a cutter is used having the contour of the dovetail, that is to say, the cutter is in the form of an inverted cone, having its base at the end of the cutter and tapering towards the shank thereof. The cutter is moved towards the material to be dovetailed so as to cut recesses of trapezoidal cross-section, thus producing the required dovetails. A template is used to control the movement of the cutter in a regular pattern and produce a series of trapezoidal recesses.

Heretofore, the template has been made in several forms, such as in the shape of a comb, the number of dovetails to be cut being limited to the number of teeth of the comb. Another form of template is a single pattern or a one-gap template. In this latter type, the template serves as a pattern which is reproduced or copied, and the desired series of dovetails is obtained by repeatedly copying the template, moving the cutter through a predetermined distance to cut the next dovetail after each dovetail is finished. Of course, since it is necessary to be able to produce dovetails of varying sizes, a series of changeable templates must be available so as to produce dovetails of the required dimensions.

Equipment designed to utilise a "one-gap" template for producing dovetails of various dimensions without the necessity of changing the template consists of a copy dovetailing machine having a cutter for cutting recesses between two male dovetails; a single template for controlling the movements of the cutter, and a copying body adapted for co-operation with the said template, the said copying body being mounted on a control lever operatively connected on the one hand with a shaft and linkage system for imparting operative feeding movement to the cutter and on the other hand with a slide for imparting spacing movements to the cutter wherein the said copying body has a continuously increasing diameter and is adjustable relatively to the template in a direction parallel to the axis of the copying body, spacing movement being imparted to the cutter through the intermediary selective spacing operation of the cutter in one or the other direction of a workpiece.

This invention is particularly directed to the particular construction of the copying body as used in the above equipment, and to the apparatus for setting and controlling the pattern of movement imparted to the cutter by the copying body.

This type of machine heretofore has been constructed for hand operation, and provided for setting the pitch and depth of cut of the cutter by means of a difficult and time-consuming system of stops. Thus, the machine had to be set up for a piece of work, with all the necessary fine adjustments, and then was moved by hand through the pattern of each dovetail to be cut.

Accordingly, a feature of my invention is the provision of only two adjustments which are required to set the pitch and depth of dovetails to be cut, with the further provision of automatic operation through a series of dovetails.

It is a further feature of my invention that the tightness of the dovetail can be adjusted to a tighter or looser union without making any special changes in the set of the machine.

Furthermore, my machine is operated with a single cutter which can be re-sharpened and used over and over again, whereas cutters used on multispindle or any other type of dovetailer have a very short life since the tightness of the dovetail is determined by the cam which does not permit adjustment.

Furthermore, my machine provides automatic feed and cuts both the male and female parts of the dovetail in one operation.

Accordingly, my invention consists of a copy dovetailing machine having a cutter for cutting recesses between two male dovetails; a single template for controlling the movements of the cutter, and a copying body adapted for co-operation with said template, the said copying body being mounted on a control lever operatively connected on the one hand with a shaft and a linkage system for imparting operative feeding movement to the cutter and on the other hand with a slide for imparting spacing movements to the cutter, wherein the said copying body has a continuously increasing diameter, said copying body having means for controlling the pattern of the operative feeding and spacing movements imparted to the cutter whereby the size of dovetail to be cut may be regulated without replacing the template or making extensive adjustments.

The accompanying drawings show by way of example the machine which I have developed to accomplish my objects, in which Figure 1 is a perspective view of my whole machine, partly broken away to show the dividing apparatus, Figure 2 is a plan view, partly in section, showing the particular arrangement of the copying body and the controls for imparting operative feeding and spacing movements to the cutter, Figure 3 is a side elevation, partly in section, taken through the line 3—3 of Figure 2, showing the copying body and the means for controlling its movement, Figure 4 is a cross section through the line 4—4 of Figure 2, showing co-operative mechanism for controlling the movements of the cutter, and Figure 5 is a detail view of the dividing apparatus.

Like reference numerals refer to like parts throughout the specification and drawings.

A single template 1 is mounted on a frame 2 by means of screws or bolts 3 and flange 4. The template 1 is provided with a semi-circular operative recess, and a copying body 5 in the shape of a truncated cone adapted to roll along the walls of the recess, and mounted on a control lever 6.

At the end opposite to the copying body 5, the control lever 6 is in driven connection with a motor 7 by means of a belt and pulley arrangement and a driving disc 8 having a reciprocating, spring-actuated ball-joint 9 adapted to receive the ball 10 on the control lever 6. The ball joint comprises a longitudinal bearing 11 extending substantially across the diameter of the disc 8, and being spring-loaded, as at 12, so that the force of the spring acts on the ball 10, for the purpose as will be explained in detail later.

The driving disc 8 may be mounted on a shaft 13 journalled in bearings 14 in any conventional manner, as illustrated in Figure 1 of the drawings. Also, the output of the motor 7 may be regulated by a series of reduction gears, as desired, for power efficiency.

The control lever 6 is pivoted by means of a slotted housing 15 which is the centre of rotation of control lever 6, and through which shaft 16 passes. Shaft 16 is flattened at 17 where it passes through the slotted housing 15 and is pivotally attached thereto by the pin 18. The shaft 16 is journalled in bearings 19 in the support 20 which extends laterally from template 1 and is spaced apart from the frame 2. The shaft 16 is journalled in bearings 21 in frame 2 and extends therethrough in operative connection with a carrier 22 mounted for sliding movement with the bed 23. Shaft 16 pases freely through carrier 22 and slidably carries thereon an arm 25 which is pivotally connected to bed 23 by means of a link 26. Shaft 16 preferably is hexagonal in shape between frame members 2—2. Similarly, the arm 25 is hexagonally-bored to receive shaft 16 in sliding engagement, thus causing the arm 25 to be actuated only due to rotative movement of shaft 16. Carrier 22 is mounted for sliding movement on the guide bars 24—25.

The copying body 5 is mounted on control lever 6 and may be adjustably positioned thereon by means of the knurled nuts 27, 28, threaded on control lever 6. The particular setting of the copying body may be regulated by means of a scale 29 which is graduated according to the pitch of the dovetail which is required to be cut, as will be described in detail later.

Intermediate the copying body 5 and the slotted housing 15, the control lever 6 is guided in a slide 30 by means of a sliding block 31 through which the control lever 6 extends. The slide 30 is provided with a supporting shaft 32 freely slidable in bearings 33 in support 20. A bar 34 is secured to slide 30 and passes freely through frame 2 into operative connection with dividing apparatus in a manner which will be described later. Preferably, the bar 34 is hexagonal in shape where it extends between the frame members 2—2. It is also pointed out that the bar 34 is journalled in frame 2 beyond the dividing apparatus so that it has limited endwise movement according to the endwise movement imparted by the slide 30.

The bed 23 carries a cutter 35 which is brought into cutting engagement with material 36 by the combined operative movements of shaft 16 and bar 34 in cooperation with the dividing apparatus, arms 25 and 26 transmitted through the control lever 6.

The cutter receives rotary movement from any suitable source, for example from a motor 36 mounted on the bed 23, or by any suitable shaft gearing, as illustrated in Figure 1.

I further provide a control wheel 37 whereby the bed 23 may be positioned manually for the purpose of setting the machine prior to commencement of automatic operation.

The dividing apparatus shown in detail in Figure 5 comprises a body 38 forming part of or attached to the carrier 22. The bar 34 passes freely through the dividing apparatus, and is supported on the under side by supporting bodies 52, 52, and has a pair of arresting members 39, 40 on the other side. The arresting members 39, 40 are rolling bodies actuated upon from one side by springs 41, 42 which urge the plungers 43, 44 against the arresting members. Inclined supporting surfaces 45, 46 are rigidly mounted in the body 20.

The arresting members are permanently biassed towards the bar 34 by the pressure of their springs 41, 42, pressing the arresting members 39, 40 between the supporting surfaces 45, 46 and the bar 34.

A switch lever 47 is mounted for rotation on a journal 48 in the body 38 of the apparatus, said lever being provided at its other end with a slot 49 engaging with a pin 50 on a bolt 51 of a suitable length mounted for sliding movement in the body 38. The switch lever may assume three positions. In its central position the bolt 51, engages both arresting members pushing them against the influence of their springs 41, 42 out of engagement with the bar 34, so that the carrier 22 may travel freely in both directions along the guide bars 24, 25. If the switch lever 47 is moved to its left-hand position, as shown in Figure 5, the left arresting member 39 is pressed by its spring 41 against the inclined surface 45 and bar 34 as it is now out of contact with the bolt 51. If the bar 34 travels to the right, it will be clamped between the arresting member 39 and the supporting bodies 52, 52, thus carrying with it the carrier 22, bed 23 and cutter 35. If, however, the bar 34 moves to the left, the clamping action is released and the carrier 22 remains at rest. The right-hand side arresting member 40 remains inoperative, and is pushed aside against the influence of its spring 42 by the bolt 51. When the switch lever 47 is thrown over to the right-hand side, the right hand arresting member becomes operative, and the left hand arresting member becomes inoperative.

One of the important features of my invention is the provision of an adjustable stop member 55 on the template 1 whereby I may limit the lower pattern of movement of the copying body 5 by raising or lowering stop member 55, according to the depth of cut required. The template 1 has a flange 56 through which a knurled head bolt 57 is screw-threaded. A further knurled nut 58 is screw-threaded on said bolt 57 in contact with said flange, and said bolt extends through and is fixedly secured to the stop member 55. The upper edge of the stop member 55 may be slightly cup-shaped. The stop member 55 is slidably mounted on template 1 by pins 59 engaging in slots 60.

Another important feature of this invention resides in the readily adjustable copying body 5, which travels along the pattern of the semi-circular recess formed in the template. It will be observed that when the copying body is moved inwardly or outwardly, as the case may be, by adjusting the knurled nuts 27 and 28, the path of travel is reduced or increased respectively. Thus, when a small dovetail is to be cut, the copying body is adjusted inwardly, and when a larger dovetail is to be cut, the copying body is adjusted outwardly on the control lever 6 by means of the nuts 27, 28, according to the graduated scale 29. The manner in which this pattern is transmitted to the cutter 35 will appear from a description which follows.

In operation, when the machine has been set up with material to be dovetailed properly secured by clamps 53, 54 and with the cutter 35 set to commence cutting in the proper position, the switch lever 47 is moved to the left (if the series of dovetails is to be cut from left to right) and the motor is switched on to actuate the control lever 6.

As the control lever 6 follows the pattern of the semi-circular operative recess, two separate and distinct movements are imparted to the cutter 35—a "spacing movement" imparted by the sidewise movement of the guide 30 as it picks up the horizontal movement of the control lever; and a "feeding movement" imparted by the vertical movement of the control lever 6 which causes the shaft 16 to rotate in the direction indicated by the arrow in Figure 1.

The "spacing movement" which is caused by the horizontal movement of control lever 6 will first be considered. If the control lever 6 moves horizontally, its movement is transmitted by the block 31, slide 30, and rod 34 to the carrier 22. The extent of this "spacing movement" is determined on the one hand by the diameter of the conical copying body 5 which is in position to engage the template 1, and on the other hand by the width of the recess in the template. It follows from Figure 1 that if the conical copying body 5 engages the template at its smallest diameter, the lever 6 will be moved through a longer path than if the conical copying body 5 engaged the template at its largest diameter.

As already disclosed, movement of the bar 34 in one direction causes the carrier 22 to travel together with the bar 34, and during movement of the bar 34 in the opposite direction, the carrier 22 will remain stationary.

Thus, horizontal movement of the control lever 6 causes horizontal or "spacing movement" of the carrier 22, bed 23 and the cutter 35. This movement is shown by the arrow B in Figure 1.

Movement of control lever 6 in a vertical direction will not cause any movement of the slide 30 in a horizontal direction, but will cause the hexagonal shaft 16 to rotate in the direction indicated by the arrow A in Figure 1. Rotation of the shaft 16 will move the arm 25 and the link 26, thus effecting a "feeding movement" of the bed 23 and cutter 35 in the direction of arrow C in Figure 1. By this movement, the cutter 35 will penetrate into the material and cut a dovetail recess.

It will thus be seen that during horizontal movement of the control lever 6, the bar 34 will be moved horizontally and the shaft 16 will remain at rest, so that the cutter 35 will be moved in spacing direction; and during vertical movement of the control lever 6, the bar 34 will remain at rest while the shaft 16 rotates so that the cutter 35 will be moved in feeding direction.

It will also be seen that the depth of cut to be performed by cutter 35 may be adjusted quickly and easily by raising or lowering the adjustable stop member 55. Similarly, the size of the dovetail may be adjusted quickly and easily by setting the copying body 5 in position to produce the desired size of dovetail according to the graduated scale 29. These two features are of prime importance in my invention and form a basis for my claim for patent.

A machine embodying the above features of construction will operate as follows:

By moving the control lever 6, the truncated body 5 rolls along the semi-circular recess of the template 1. The movement of the lever 6 is transmitted through the intermediary of the slide 30 to the bar 34 which moves in the direction of arrow B. At the same time, however, the control lever 6, following the contour of the semi-circular recess of the template 1, moves in a horizontal direction, thus causing the hexagonal shaft 16 to rotate. These two movements produce on the one hand a longitudinal movement of the carrier 22 in the direction of the arrow B, Figure 1, and a lateral movement of the bed 23 with the cutter 35 in the direction of the arrow C. By the combination of these two movements, a semi-circular movement of the cutter is obtained. Again, the depth of cut is directly dependent upon the extent of rotation of shaft 16, and this movement, which is controlled by lever 6 is regulated by adjustable stop member 55.

It will be observed that this machine will continue to cut dovetails of the same dimension continuously due to the automatic operation of the control lever 6. It is not necessary to reset the machine after each dovetail has been completed, so that a complete series of dovetails may be cut without stopping or adjustment.

Of course, if it is desired to set the machine for a fresh piece of material requiring a different size of dovetail, this may be done without the need of changing templates or making extensive adjustments which heretofore have required considerable time and resulted in delay in operations.

It should also be observed that this equipment may be manually operated by disconnecting the motor and adding a handle on the end of the control lever 6 which carries the copying body. In such a manually-operated machine, it will be apparent that the stop member 55 and the copying body 5 will permit the same adjustable functions as in the power-operated machine.

It is pointed out that by my particular arrangement I am able to produce four different types of dovetails, namely, round pin open dovetails, round pin half-secret dovetails, secret-mitred dovetails and box taper dovetails, as well as tongue and grooving, without the need of special adaptors or change of machinery.

My equipment will produce dovetails ranging in size from ⅜" to 1¼", whereas in existing multi-spindle equipment, the size is limited to the spacing of the spindle and to the size of the cutter.

Any comparative machine of the multi-spindle type will require from 7 to 15 horsepower, whereas my machine requires only 1 horsepower.

What I claim as new and desire to protect by Letters Patent of the United States is:

1. A copy dovetailing machine having a cutter for cutting recesses between two male dovetails; a single template for controlling the movements of the cutter; and a copying body of continuously increasing diameter adapted for co-operation with said template; a shift, a linkage system, a slide and a control lever, said copying body being mounted on said control lever operatively connected on the one hand with said shaft and said linkage system for imparting operative feeding movement to the cutter and on the other hand with said slide for imparting spacing movements to the cutter; means for adjusting said copying body relatively to the template in a direction parallel to the axis of the copying body; a dividing apparatus adapted to produce selective spacing operation of the cutter in one or the other direction of a workpiece, spacing movement being imparted to the cutter through the intermediary of said dividing apparatus; means for adjusting the path of travel of said copying body to limit the operative feeding movement to said cutter; tension means for guiding said copying body along the pattern of said template; and means for actuating said control lever.

2. A machine according to claim 1 wherein the copying body is in the form of a truncated cone, and the means for adjusting said copying body relatively to the template in a direction parallel to the axis of the copying body comprises a stop member slidably mounted on the template in register with the lower portion of a semi-circular recess therein forming the path of travel of said copying body, a flange on the lower edge of said stop member in register with a flange on said template, and means for adjusting the space between said two flanges.

3. A machine according to claim 1 wherein the means for adjusting said copying body relatively to the template in a direction parallal to the axis of the copying body comprises a stop member slidably mounted on the template in register with the lower portion of a semi-circular recess therein forming the path of travel of said copying body, a flange on the lower edge of said stop member in register with a flange on said template, and means for adjusting the space between said two flanges, and wherein the copying body is in the form of a truncated cone screw-threaded on said control lever, a graduated scale on said control lever in register with said copying body and means for lockably securing said copying body on said control lever.

4. A machine according to claim 3 in which said dividing apparatus comprises two arresting members cooperating with a bar actuated by the control lever of the machine, the arresting members being adapted to be selectively brought into or out of operative engagement with the bar, one at a time only or both at the same time.

5. A machine according to claim 3 in which said dividing apparatus comprises a bolt actuated by a switch lever, said bolt being adapted to remove either one or both arresting members out of clamping engagement with the bar.

6. A copy dovetailing machine having a cutter for cutting recesses between two male dovetails; a single template for controlling the movements of the cutter; and a copying body in the form of a truncated cone having a continuously increasing diameter adapted for cooperation with said template; a shaft, a linkage system, a slide and a control lever, said copying body being mounted on said control lever operatively connected on the one hand with said shaft and said linkage system for imparting operative feeding movement to the cutter and on the other hand with said slide for imparting spacing movements to the cutter; a graduated scale on said control lever in register with said copying body, said copying body being adjustable relatively to the template in a direction parallel to the axis of the copying body by means of a stop member slidably mounted on the template in register with the lower portion of a semi-circular recess therein forming the path of travel of said copying body; a flange on the lower edge of said stop member in register with a flange on said template and means for adjusting the space between said two flanges, whereby the length of vertical travel of the copying body may be regulated; means for lockably securing said copying body on said control lever; a dividing apparatus adapted to produce selective spacing operation of the cutter in one or the other direction of a workpiece, spacing movement being imparted to the cutter through the intermediary of said dividing apparatus; tension means for guiding said copying body along the pattern of said template comprising a disc in driving connection with the end of said control lever remote from said copying body, a spring loaded ball joint, said spring exerting a constant pressure on said remote end of the control lever and an equal and opposite force being transmitted to the copying body; and means for actuating said copying body continuously through the pattern of said template, to produce a series of uniform male and female dovetails simultaneously in a workpiece.

References Cited in the file of this patent
UNITED STATES PATENTS

| | | |
|---|---|---|
| 1,058,441 | Kelly | Apr. 8, 1913 |
| 2,225,263 | Farrell | Dec. 17, 1940 |